(12) United States Patent
Gonthier et al.

(10) Patent No.: US 9,264,650 B1
(45) Date of Patent: Feb. 16, 2016

(54) VIDEO ENCODER SYSTEM

(75) Inventors: Nicolas Gonthier, St. Eustache (CA); Guy Shahmoon, Montreal (CA)

(73) Assignee: VERINT VIDEO SOLUTIONS INC., MELVILLE, NY (US)

( * ) Notice: Subject to any disclaimer, the term of this patent is extended or adjusted under 35 U.S.C. 154(b) by 718 days.

(21) Appl. No.: 12/768,948

(22) Filed: Apr. 28, 2010

Related U.S. Application Data (60) Provisional application No. 61/178,939, filed on May 16, 2009.

(51) Int. Cl.
- *H04N 5/228* (2006.01)
- *H04N 5/77* (2006.01)
- *H04N 9/04* (2006.01)

(52) U.S. Cl.
CPC .............. *H04N 5/772* (2013.01); *H04N 9/045* (2013.01)

(58) Field of Classification Search
CPC ... H04N 5/23241; H04N 5/232; H04N 5/335; H04N 13/044; H04N 5/225; H04N 5/23203; H04N 7/181; H04N 5/2258; H04N 2005/2255; H04N 5/04; H04N 5/23293; H04N 5/765; H04N 5/772; H04N 5/907; H04N 5/91; H04N 7/147; H04N 9/8042

USPC ............................................. 348/159; 333/25
See application file for complete search history.

(56) References Cited

U.S. PATENT DOCUMENTS

| | | | | |
|---|---|---|---|---|
| 2003/0071902 A1* | 4/2003 | Allen | ............... | G08B 13/19645 348/211.11 |
| 2004/0163118 A1* | 8/2004 | Mottur | ............... | H04N 5/23203 725/105 |
| 2005/0248653 A1* | 11/2005 | Hoang | ........................... | 348/143 |
| 2009/0243749 A1* | 10/2009 | Rofougaran | ..................... | 333/25 |
| 2012/0184331 A1* | 7/2012 | Rofougaran et al. | ....... | 455/556.1 |

* cited by examiner

*Primary Examiner* — Twyler Haskins
*Assistant Examiner* — Carramah J Quiett
(74) *Attorney, Agent, or Firm* — Meunier Carlin & Curfman (57) ABSTRACT

A video system comprises a camera, an enclosure, and an interface system integrated with the enclosure. The interface is configured to receive, on a link external to the enclosure, video captured by the camera and transfer the video on a link internal to the enclosure. The video system further includes a conversion module and a processing system. The conversion module is configured to receive the video on the internal link and transfer the video for delivery to the processing system on another internal link which has a different characteristic impedance than the first internal link. The processing system is configured to receive the video on the other internal link and encode the video. The video system further includes a monitoring system which is configured to display and store the video.

20 Claims, 6 Drawing Sheets

VIDEO ENCODER SYSTEM

RELATED APPLICATIONS

This application is related to and claims priority to U.S. Provisional Patent Application No. 61/178,939, entitled "Video Encoder System" filed on May 16, 2009, which is hereby incorporated by reference in its entirety.

TECHNICAL BACKGROUND

Many common video systems, security systems in particular, include video cameras which are connected to a video encoder system. The video encoder system is configured to receive and process streams of video data received from each of the cameras. Often times, each camera has a power connection, an input for receiving positioning instructions, and an output for transmitting video data. The cameras are typically configured to transmit the video data over a coaxial cable while the positioning instructions are often provided to the camera over different types of cables. Sometimes, power and video data are both transmitted over the coaxial cable but interfaced to the camera through separate connectors. Each camera typically has two or more separate connectors and thus requires connectors and cabling of two or more different types for proper operation. This configuration requires multiple types of cables to be installed between each camera and the video encoder system.

Furthermore, many video encoder systems internally process video signals at a characteristic impedance which is different than the characteristic impedance required to transfer the video signal over the coaxial cable. As a result, an impedance matching device, or a balun, must be used to convert the video signal from each camera to a different impedance before it can be processed by the video encoder system. Depending on the type of cameras and the type of cables used, two baluns may be required to complete a single connection between the camera and the video encoder. This approach has multiple disadvantages. First, there is increased cost because multiple types of connectors and cables must be used to interface the camera to the video encoder system. Second, there is additional cost penalty because a balun must be used between the camera and the video encoder system. A third cost penalty exists because coaxial cable is required and it is generally more expensive than many other types of cable. Finally, installation is complicated and reliability is decreased as the number of necessary devices and interconnections increases.

OVERVIEW

In various embodiments, a video encoder system and methods of operating a video system are provided. In one embodiment, a video encoder system comprises an enclosure for housing a conversion module and a processing system and an interface system integrated with the enclosure. The interface is configured to receive on an external link video captured by a camera, and transfer the video on a first internal link. The conversion module is configured to receive the video on the first internal link and transfer the video for delivery to the processing system on a second internal link that has a different characteristic impedance than the first internal link. The processing system is configured to receive the video on the second internal link and encode the video.

In another embodiment, a video system comprises a camera, an enclosure, and an interface system integrated with the enclosure. The interface is configured to receive, on an external link, video captured by the camera and transfer the video on an internal link. The video system further includes a conversion module and a processing system. The conversion module is configured to receive the video on the internal link and transfer the video for delivery to the processing system on another internal link which has a different characteristic impedance than the first internal link. The processing system is configured to receive the video on the other internal link and encode the video. The video system further includes a video storage and display system.

In another embodiment, a video system includes an enclosure and an interface system integrated with the enclosure. The interface is configured to receive, on an external link, video captured by a camera and transfer the video on an internal link. The external link is a twisted pair cable and may be, for example, a Category 5 Cable. The interface system may, for example, comprise an RJ-45 connector. The internal link has approximately the same characteristic impedance as the external link. The video system further includes a conversion module and a processing system. The conversion module is configured to receive the video on the internal link and transfer the video for delivery to the processing system on another internal link which has a different characteristic impedance than the first internal link. The conversion module may, for example, be a balun. The other internal link may, for example, be a coaxial cable. The processing system is configured to receive the video on the other internal link and encode the video.

DETAILED DESCRIPTION

FIGS. 1-6 and the following description depict specific embodiments of the invention to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will appreciate that the features described below can be combined in various ways to form multiple embodiments and variations of the invention. As a result, the invention is not limited to the specific embodiments described below, but only by the claims and their equivalents.

Video systems often include video cameras which are connected to one or more video encoder systems. Each video encoder system is configured to process the streams of video data received from each of the cameras. Among other things, the video encoder system may be responsible for receiving video data from each of the cameras, processing the video data, sending the video data to a storage or display device, making the video data available to users, controlling the positioning and operation of the cameras, or providing video processing and analysis functions. There may be many cameras associated with each video system and those cameras are often spread out over relatively large physical distances. This is especially true in security and surveillance applications where it is desirable to have video data from many different physical locations fed to a single location for processing, viewing, analysis, or storage.

Because the cameras may be spread out over relatively large physical distances, the cabling required to make proper connections to of all the cameras can be complex and costly. Often, each camera has at least a power connection and an output for transmitting video data. Cameras which can be remotely positioned and adjusted also have an input for receiving pan, tilt, and zoom (PTZ) or other positioning instructions. Cameras are commonly configured to transmit video data over a coaxial cable while the power and PTZ instructions are often sent to the camera over different types of cables. In some cases, the power, video data, and PTZ instructions may all be transmitted over the coaxial cable. However, they are still often split out and attached to camera using separate connectors. Consequently, each camera usually has multiple separate connectors and requires connectors and cabling of two, three, or more different types for proper operation. In a video system installation with many cameras, managing multiple types of cables and connections has significant effects on equipment costs, installation costs, maintenance costs, and reliability.

Coaxial cable is a type of electrical cable which has an inner electrical conductor surrounded by a tubular, insulating layer. The insulating layer is further surrounded by a tubular electrical conducting layer called the shield. The entire assembly is covered with another tubular insulating layer on the outside. All the layers share the same geometric axis and the internal insulating layer maintains a uniform radial distance between the two conductors. The internal insulating layer has a high dielectric constant. This configuration results in a cable in which the electromagnetic fields associated with the transmitted signals exist primarily between the inner and outer conductors. This creates an effective means for transmitting radio frequency and video signals with minimal interference and loss. This configuration also results in the cable which has a uniform characteristic impedance throughout the length of the cable. Equipment or components attached to each end of the cable must present an impedance which is matched to the characteristic impedance of the cable in order to accomplish effective signal transfer and minimize signal reflections on the cable.

Twisted pair cables are cables in which individual forward and return conductors are twisted together for the purpose of canceling out electromagnetic interference. Since the wires carry equal but opposite signals, introduction of noise from external sources tends to couple to both wires and is cancelled at the receiving end through common mode rejection. A twisted pair cable usually has multiple pairs of twisted conductors which may or may not be individually shielded depending on the needs of the application. As twisted pair design, manufacture, and usage has progressed, it has become possible to use twisted pair cables in higher and higher bandwidth applications. Currently, it is possible to transmit baseband video signals over twisted pair cabling even though coaxial cable has traditionally been used. Relative to coaxial cable, twisted pair cabling has the benefit of being less expensive, more pliable, more space efficient, and the connectors used to terminate it are generally less expensive and easier to attach to the cable.

For the reasons described above, as well as for other reasons, it is advantageous to connect a video camera to a video encoder system using a cable which is more inexpensive and more pliable than coaxial cables. It will also be advantageous if that cables is capable of carrying signals between the camera and the video encoder system in addition to video. Twisted pair cabling is one example of another type of cable which may meet these needs. However, due to the fact that twisted pair cables are made in different configurations than coaxial cables and using different materials, twisted pair cables normally have different electrical characteristics than most coaxial cables. For high bandwidth signals, one important electrical characteristic is the cable's characteristic impedance. If the characteristic impedance is not matched between devices, connectors, and cables, signal transfer will be significantly degraded by the signal reflections which occur at each interface where there is a mismatched impedance. Baluns may also be used to convert single ended signals which are referenced to ground to differential signals which are not referenced to ground.

Since most video processing and video encoder systems are designed based on circuitry which has a particular impedance, an impedance mismatch often exists between the cable carrying the video signal and the video equipment. Consequently, an impedance matching device is often used at the termination of the cable to change the signal to the proper impedance before it enters the video equipment. These impedance matching devices allow a cable or device of one characteristic impedance to be connected to a cable or device of another characteristic impedance while primarily avoiding the reflections and other destructive affects described previously. A balun is one example of a device often used to perform this impedance matching function. A balun is a specialized electrical transformer which relays a signal and converts the impedance of that signal while avoiding the reflections and signal loss normally associated with connecting two devices of mismatched impedance.

Figure 1:
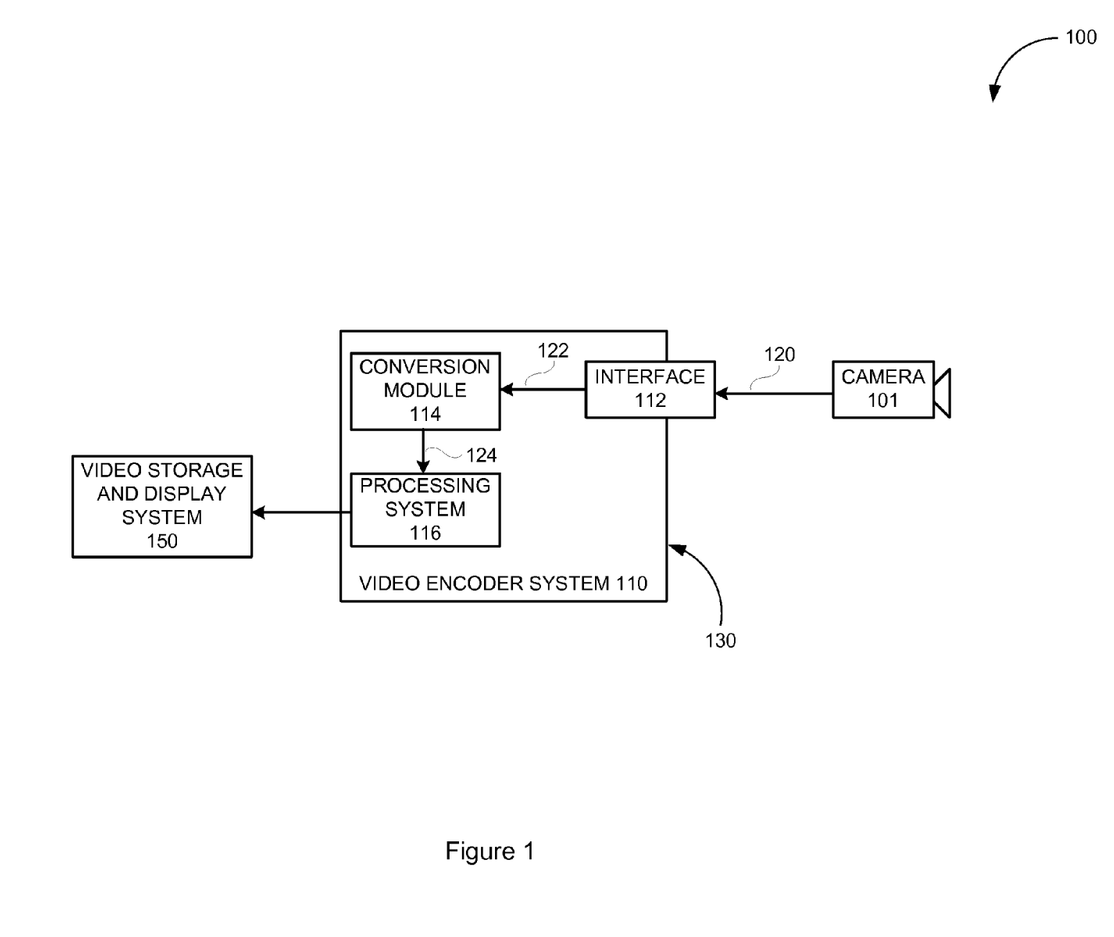
FIG. 1 illustrates a video system.

FIG. 1 illustrates video system 100. Video system 100 comprises camera 101, video encoder system 110, and video storage and display system 150. Video encoder system 110 comprises enclosure 130 and interface 112, which is integrated with enclosure 130. Interface 112 is configured to receive, on external link 120, video captured by camera 101 and transfer the video on internal link 122. Video encoder system 110 further comprises conversion module 114 and processing system 116. Conversion module 114 is configured to receive the video on internal link 122 and transfer the video for delivery to processing system 116 on internal link 124. Internal link 124 has a different characteristic impedance than internal link 122. Processing system 116 is configured to receive the video on internal link 124 and encode the video. Video encoder system 110 may operate independently of video storage and display system 150 or may include the storage and display functions within video encoder system 110.

Figure 2:
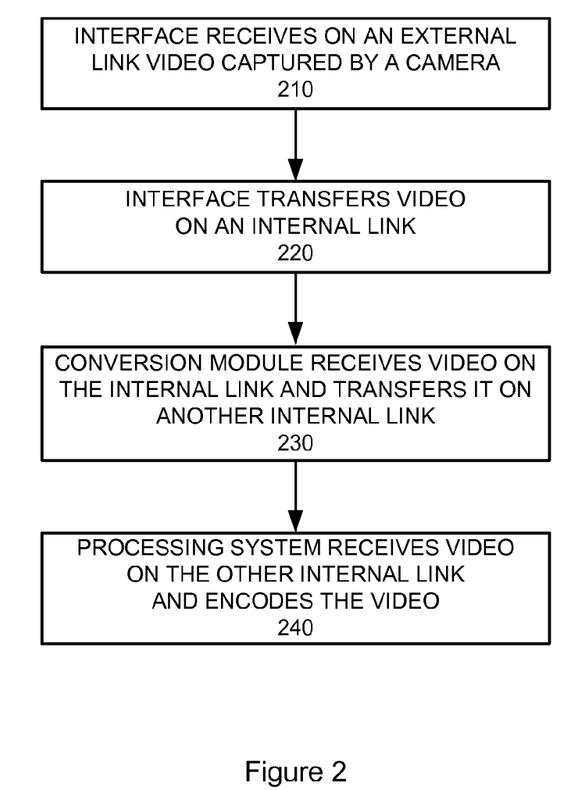
FIG. 2 illustrates the operation of a video system.

FIG. 2 illustrates the operation of a video encoder system. First, an interface receives, on an external link, video captured by a camera (step 210). The interface transfers the video on an internal link within the video encoder system (step 220). A conversion module receives the video on the internal link and then transfers it on another internal link (step 230). A processing system receives the video on this other internal link and encodes the video (step 240).

Figure 3:
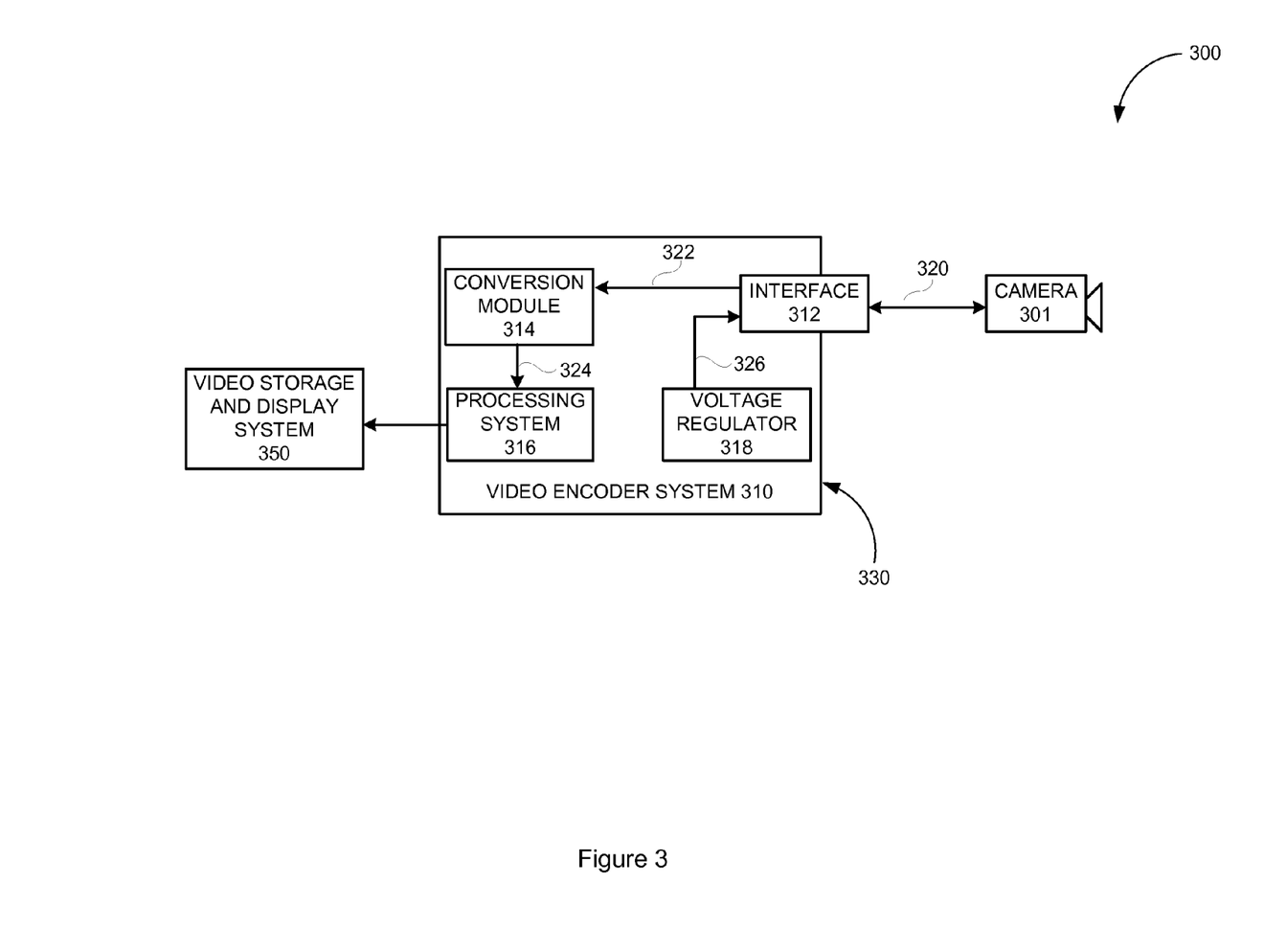
FIG. 3 illustrates a video system.

FIG. 3 illustrates video system 300 in which power is supplied to the camera by the video encoder system. Video system 300 comprises camera 301, video encoder system 310, and video storage and display system 350. Video encoder system 310 comprises enclosure 330 and interface 312, which is integrated with enclosure 330. Video encoder system 310 further comprises conversion module 314, processing system 316, and voltage regulator 318.

Interface 312 is configured to receive, on external link 320, video captured by camera 301 and transfer the video on internal link 322. Interface 312 may be a bulkhead connector mounted into the wall of enclosure 330. External link 320 may be a twisted pair cable and contain multiple pairs of twisted pair conductors. Signals may be sent both directions on external link 320 between interface 312 and camera 301. External link 320 may connect to interface 312 by means of a modular connector. One example of a connector which would perform this function is an RJ-45 connector.

Voltage regulator 318 provides power to camera 301 over internal link 326 and through interface 312. The power is transferred from interface 312 to camera 301 over the same external link 320 which camera 301 uses to send the video data to interface 312. As discussed above, external link 320 may be a twisted pair cable, or, more specifically, a Category 5 cable. External link 320 may have a characteristic impedance which is nominally 100 ohms. However, the power to the camera is not transferred over internal link 322, over internal link 324, or through conversion module 314. Using this configuration, the camera can be powered and operated through only a single twisted pair cable and connection. No other cables or devices are necessary to establish an operable connection between video encoder system 310 and camera 301.

Conversion module 314 is configured to receive the video on internal link 322 and transfer the video for delivery to processing system 316 on internal link 324. Internal link 322 may be another twisted pair cable or other type of conductor which has a characteristic impedance similar to that of external link 320. The video signal on external link 320 has essentially the same impedance as it does when being transferred over internal link 322 which is part of video encoder system 310 and inside enclosure 330. However, internal link 324 has a different characteristic impedance than internal link 322. Internal link 324 may have a characteristic impedance which is nominally 75 ohms. The impedance transformation is performed by conversion module 314. Conversion module 314 may be a balun or other electrical transformer device performing a similar function. Conversion module 314 converts the characteristic impedance of the video signal such that its characteristic impedance is compatible with processing system 316 and other components of video encoder system 310. Conversion module 314 may also perform additional signal conditioning functions on the video signal.

Processing system 316 is configured to receive the video on internal link 324 and encode the video. Internal link 324 has a different characteristic impedance than internal link 322. The characteristic impedance of internal link 324 may be lower than the characteristic impedance of internal link 322. Internal link 324 may be coaxial cable or utilize another electrical interconnection method with a characteristic impedance which is similar to that of coaxial cable and different than the characteristic impedance of internal link 322. Video storage and display system 350 may include digital video recorder (DVR) functionality, video analytics tools, or other video management functions. Video encoder system 310 may operate independently of video storage and display system 350 or it may include the storage and display functions within video encoder system 310.

Figure 4:
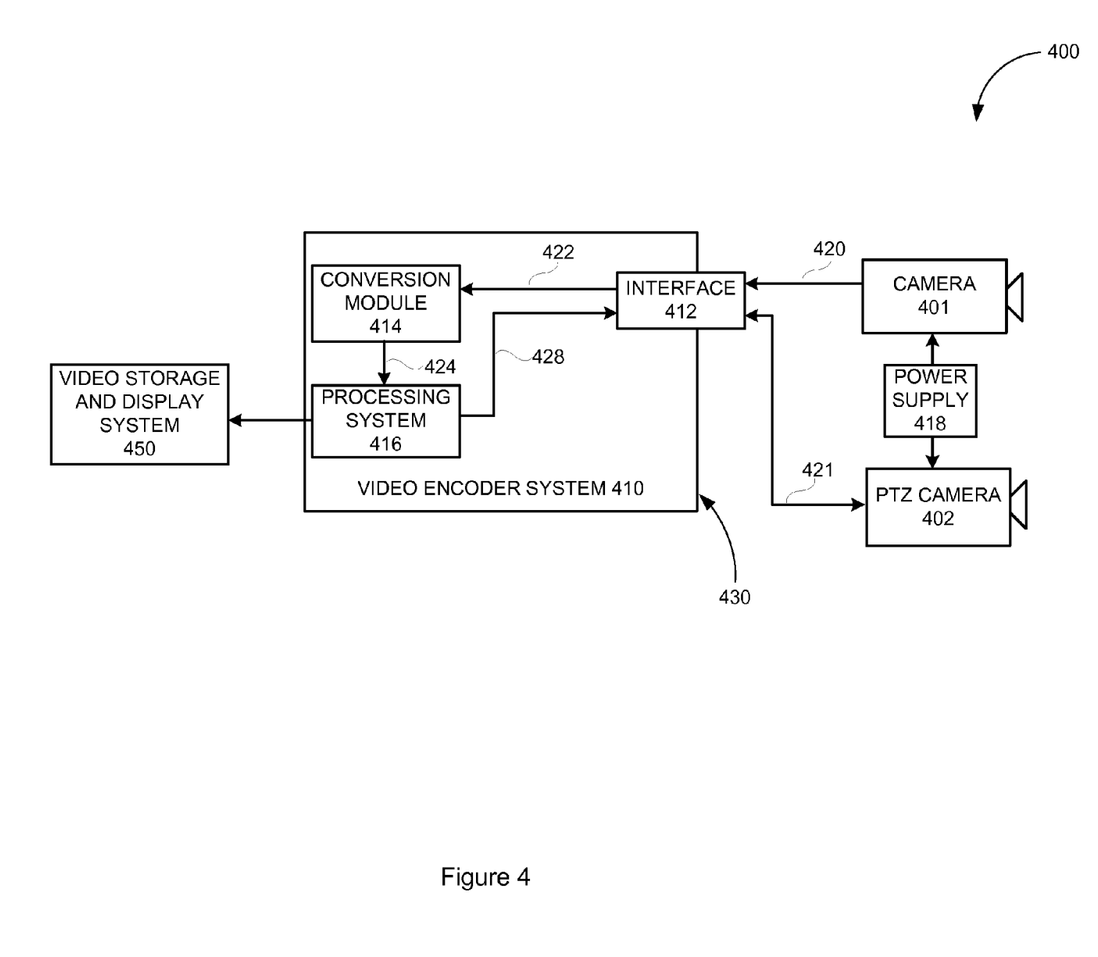
FIG. 4 illustrates a video system.

FIG. 4 illustrates video system 400. Video system 400 comprises camera 401, PTZ camera 402, video encoder system 410, power supply 418, and video storage and display system 450. Video encoder system 410 comprises enclosure 430 and interface 412, which is integrated with enclosure 430. Video encoder system 410 further comprises conversion module 414 and processing system 416.

PTZ camera 402 is capable of executing pan, tilt, and zoom commands which allow an operator or system to remotely reposition the camera or change the camera lens zoom in order to adjust the area or scene being viewed. Video system 400 may comprise additional cameras which may have features similar to camera 401, features similar to PTZ camera 402, a subset of the PTZ features of PTZ camera 402, or additional features. Power supply 418 provides power to both cameras.

Interface 412 is configured to receive, on external link 420, video captured by camera 401 and PTZ camera 402 and transfer the video from both cameras on internal link 422. The video data from multiple cameras may be multiplexed onto a single internal link, like internal link 422, as shown in FIG. 4 or there may be multiple internal links to transfer the video from each camera to conversion module 414. Interface 412 may be a bulkhead connector mounted into the wall of enclosure 430. A single interface may be used to support multiple cameras as shown in FIG. 4 or multiple interfaces may exist to support multiple cameras. External links 420 and 421 may be twisted pair cables and contain multiple pairs of twisted pair conductors. More specifically, external links 420 and 421 may be Category 5 cables.

Signals may be sent both directions on external links 420 and 421 between interface 412 and the cameras. External link 421 is used to send pan, tilt, zoom, or other command instructions to PTZ camera 402 as well as receive video data from PTZ camera 402. External links 420 and 421 may connect to interface 412 by means of a modular connector. One example of a connector which would perform this function is an RJ-45 connector. No additional devices or cables are necessary to establish operable connections between video encoder 410 and cameras 401 and 402.

Conversion module 414 is configured to receive the video on internal link 422 and transfer the video for delivery to processing system 416 on internal link 424. Internal link 422 may be another twisted pair cable or other type of conductor which has a characteristic impedance similar to that of external link 420. The video signals on external links 420 and 421 have essentially the same impedance as they do when being transferred over internal link 422 which is part of video encoder system 410 and inside enclosure 430. However, internal link 424 has a different characteristic impedance than internal link 422. The impedance transformation is performed by conversion module 414. Conversion module 414 may be a balun or other electrical transformer device performing a similar function. Conversion module 414 converts the characteristic impedance of the video signal such that its characteristic impedance is compatible with processing system 416 and other components of video encoder system 410. Conversion module 414 may also perform additional signal conditioning functions on the video signal.

Processing system 416 is configured to receive the video on internal link 424 and encode the video. Internal link 424 has a different characteristic impedance than internal link 422. The characteristic impedance of internal link 424 may be lower than the characteristic impedance of internal link 422. Internal link 424 may be coaxial cable or utilize another electrical interconnection method with a characteristic impedance which is similar to that of coaxial cable and different than the characteristic impedance of internal link 422. Video storage and display system 450 may include DVR functionality, video analytics tools, or other video management functions. Video encoder system 410 may operate independently of video storage and display system 450 or may include the storage and display functions within video encoder system 410.

Figure 5:
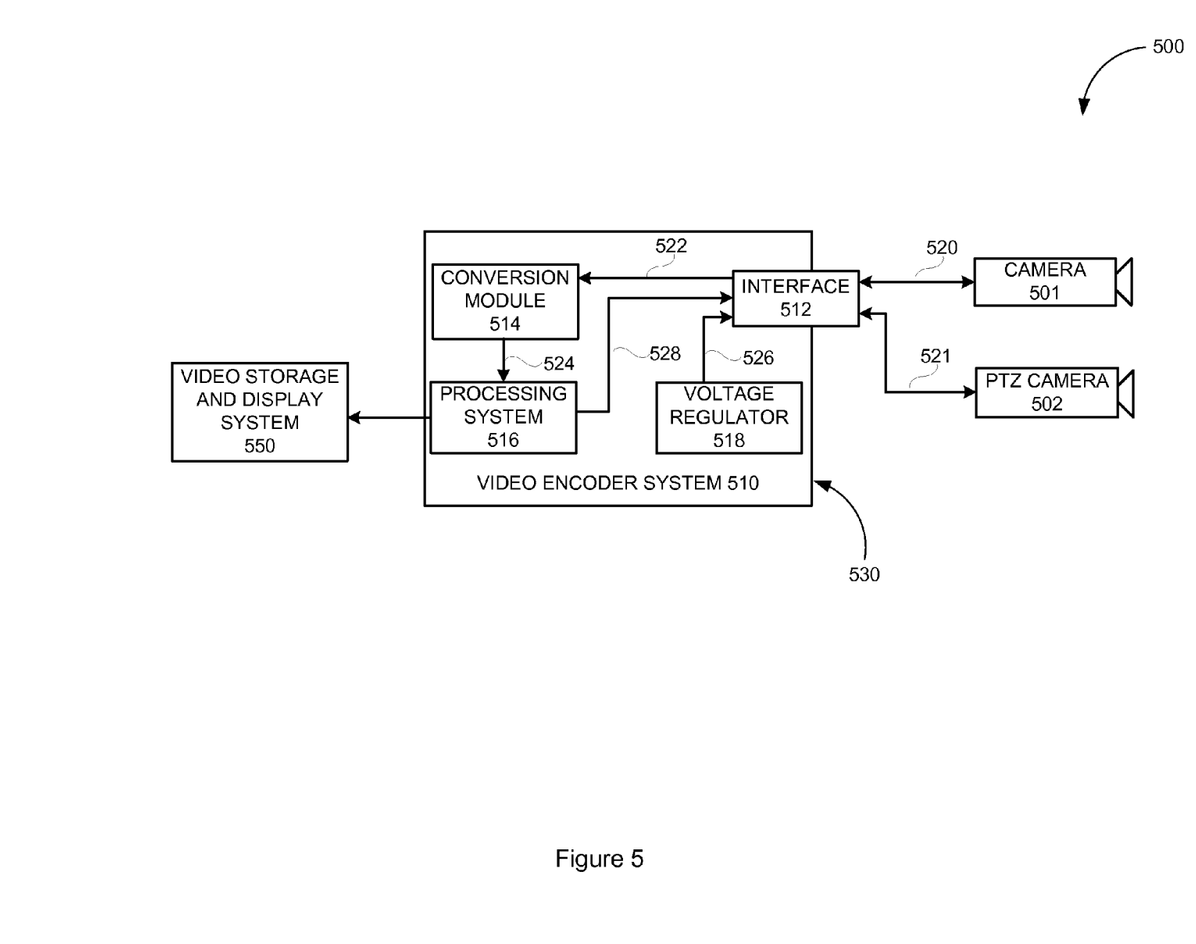
FIG. 5 illustrates a video system.

FIG. 5 illustrates video system 500 in which the interconnections between a video encoder system and the associated cameras are accomplished using only a single cable for each camera. Video system 500 comprises camera 501, PTZ camera 502, video encoder system 510, and video storage and display system 550. Video encoder system 510 comprises enclosure 530 and interface 512, which is integrated with enclosure 530. Video encoder system 510 further comprises conversion module 514, processing system 516, and voltage regulator 518.

PTZ camera 502 is capable of executing pan, tilt, and zoom commands which allow an operator or a system to remotely reposition the camera or change the camera lens zoom in order to adjust the area or scene being viewed. Video system 500 may comprise additional cameras which may have features similar to camera 501, features similar to PTZ camera 502, a subset of the PTZ features of PTZ camera 502, or additional features.

Interface 512 is configured to receive, on external link 520, video captured by camera 501 and PTZ camera 502 and transfer the video from both cameras on internal link 522. The video data from multiple cameras may be multiplexed onto a single internal link, like internal link 522, as shown in FIG. 5 or there may be multiple internal links to transfer the video from each camera to conversion module 514. Interface 512 may be a bulkhead connector mounted into the wall of enclosure 530. A single interface may be used to support multiple cameras as shown in FIG. 5 or multiple interfaces may exist to support multiple cameras. External links 520 and 521 may be twisted pair cables and contain multiple pairs of twisted pair conductors. More specifically, external links 520 and 521 may be Category 5 cables.

Voltage regulator 518 provides power to camera 501 and PTZ camera 502 over internal link 526 and through interface 512. The power is transferred from interface 512 to camera 501 over the same external link 520 which camera 501 uses to send the video data to interface 512. Similarly, power is transferred from interface 512 to PTZ camera 502 over the same external link 521 which PTZ camera 502 uses to send the video data to interface 512. However, the power is not transferred over internal link 522, over internal link 524, or through conversion module 514. In addition, processing system 516 sends PTZ instructions to PTZ camera 502 over internal link 528 and through interface 512. The PTZ instructions are transferred from interface 512 to PTZ camera 502 over external link 521, the same external link which carries power and video data. Using this configuration, the cameras can be powered and operated through only a single twisted pair cable and connection. No other cable or device is needed to establish an operable connection between video encoder system 510 and each camera.

Conversion module 514 is configured to receive the video on internal link 522 and transfer the video for delivery to processing system 516 on internal link 524. Internal link 522 may be another twisted pair cable or other type of conductor which has a characteristic impedance similar to that of external link 520. The video signals on external links 520 and 521 have essentially the same impedance as they do when being transferred over internal link 522 which is part of video encoder system 510 and inside enclosure 530. However, internal link 524 has a different characteristic impedance than internal link 522. The impedance transformation is performed by conversion module 514. Conversion module 514 may be a balun or other electrical transformer device performing a similar function. Conversion module 514 converts the characteristic impedance of the video signal such that its characteristic impedance is compatible with processing system 516 and other components of video encoder system 510. If there are multiple internal links, like internal link 522, between interface 512 and conversion module 514, conversion module 514 may comprise multiple baluns performing the conversion function in parallel. Conversion module 514 may also perform other signal conditioning functions on the video signal.

Processing system 516 is configured to receive the video on internal link 524 and encode the video. Internal link 524 has a different characteristic impedance than internal link 522. The characteristic impedance of internal link 524 may be lower than the characteristic impedance of internal link 522. Internal link 524 may be coaxial cable or utilize another electrical interconnection method with a characteristic impedance which is similar to that of coaxial cable and different than the characteristic impedance of internal link 522. Video storage and display system 550 may include DVR functionality, video analytics tools, or other video management functions. Video encoder system 510 may operate independently of video storage and display system 550 or may include the storage and display functions within video encoder system 510.

Figure 6:
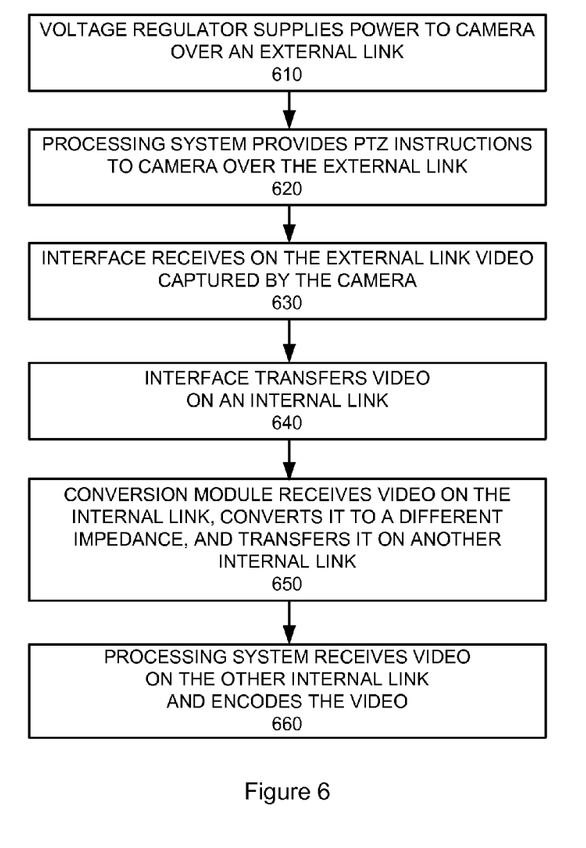
FIG. 6 illustrates the operation of a video system.

FIG. 6 illustrates the operation of a video encoder system. First, a voltage regulator supplies power to a camera over an external link (step 610). The external link may be a twisted pair cable that is also used for other camera functions. Next, a processing system sends PTZ or other control function signals to the camera over the same external link (step 620). An interface on the video encoder system receives, over the external link, video captured by the camera (step 630). The external link is the same link which is used to send power and PTZ instructions to the camera. The interface transfers the video on an internal link within the video encoder system (step 640). A conversion module receives the video on the internal link, converts it to a different impedance, and then transfers it on another internal link (step 650). A processing system receives the video on this other internal link and encodes the video (step 660).

What is claimed is:

1. A video encoder system comprising:
    an enclosure for housing a conversion module and a processing system; and an interface system integrated with the enclosure, wherein the interface system comprises multiple interfaces supporting multiple cameras for video capture;
    the interface system configured to receive on external links video captured by multiple cameras;
    the interface system further configured to transfer the video to the conversion module on a first internal link;
    the conversion module configured to receive the video on the first internal link;
    the conversion module further configured to transfer the video for delivery to the processing system on a second internal link that has a different characteristic impedance than the first internal link;
    the processing system configured to receive the video on the second internal link; and the processing system further configured to encode the video.

2. The video encoder system of claim 1 wherein the conversion module is internal to the enclosure.

3. The video encoder system of claim 1 wherein the conversion module matches the impedance between the first internal link and the second internal link.

4. The video encoder system of claim 1 wherein the conversion module comprises a balun.

5. The video encoder system of claim 1 wherein the characteristic impedance of the first internal link is greater than the characteristic impedance of the second internal link.

6. The video encoder system of claim 1 wherein the external link comprises a Category 5 cable.

7. The video encoder system of claim 1 wherein power is transferred to the camera over a third internal link and the external link without being transferred over the first internal link or the second internal link.

8. The video encoder system of claim 1 wherein positioning instructions are transferred to the camera over the external link.

9. The video encoder system of claim 1 wherein the interface system comprises a RJ-45 receptacle.

10. A method for operating a video system comprising:
receiving over an external link at an interface system integrated with an enclosure, video captured by a camera, wherein the interface system comprises multiple interfaces supporting multiple cameras for video capture;
transferring the video on a first internal link;
receiving the video on the first internal link at a conversion module;
transferring the video on a second internal link that has a different characteristic impedance than the first internal link;
receiving the video on the second internal link at a processing system; and encoding the video.

11. The method of claim 10 wherein the conversion module is internal to the enclosure.

12. The method of claim 10 wherein the conversion module matches the impedance between the first internal link and the second internal link.

13. The method of claim 10 wherein the conversion module comprises a balun.

14. The method of claim 10 wherein the characteristic impedance of the first internal link is greater than the characteristic impedance of the second internal link.

15. The method of claim 10 wherein the external link comprises a Category 5 cable.

16. The method of claim 10 wherein power is transferred to the camera over a third internal link and the external link without being transferred over the first internal link or the second internal link.

17. The method of claim 10 wherein positioning instructions are transferred to the camera over the external link.

18. The method of claim 10 wherein the interface system comprises a RJ-45 receptacle.

19. A video system comprising:
an enclosure for housing a conversion module and a processing system; a camera configured to capture video;
the camera further configured to transfer the captured video on a link which is external to the enclosure; and
an interface system integrated with the enclosure, wherein the interface system comprises multiple interfaces supporting multiple cameras for video capture;
the interface system configured to receive the video on the external link;
the interface system further configured to transfer the video on a first internal link; the conversion module configured to receive the video on the first internal link;
the conversion module further configured to transfer the video for delivery to the processing system on a second internal link that has a different characteristic impedance than the first internal link;
the processing system configured to receive the video on the second internal link the processing system further configured to encode the video;
wherein power is transferred to the camera over a third internal link and the external link without being transferred over the first internal link or the second internal link.

20. The video encoder system of claim 1 further comprising a monitoring system configured to display and store the video.

* * * * *